Dec. 29, 1936.  J. L. ARTHUR  2,065,882
STARTING AND IGNITION SYSTEM
Filed Aug. 5, 1933

INVENTOR
JAMES L ARTHUR
BY
ATTORNEY

Patented Dec. 29, 1936

2,065,882

UNITED STATES PATENT OFFICE 2,065,882

STARTING AND IGNITION SYSTEM

James L. Arthur, Anderson, Ind., assignor, by mesne assignments, to General Motors Corporation, Detroit, Mich., a corporation of Delaware Application August 5, 1933, Serial No. 683,761

10 Claims. (Cl. 290—38)

This invention relates to starting and ignition circuits of automotive vehicles.

It is an object of the invention to provide an automotive starting and ignition circuit by which the engine ignition timing will be automatically retarded for engine starting purposes, and immediately advanced thereafter for engine running conditions. This has been accomplished by providing means that are operable coincident with the closing of the starting motor circuit to produce an actual spark retard relation for engine cranking conditions, the spark altering means being immediately rendered nonoperative upon deenergization of the starting motor circuit.

A further object of the invention is to provide a step like shift of the spark timing relation of engine ignition apparatus during engine cranking and running conditions. This has been accomplished by providing means for actuating the spark timing shift, and controlling these means by additional means that are operable to control the shifting means only upon the operation of certain functions or circuit conditions.

Further objects and advantages of the present invention will be apparent from the following description, reference being had to the accompanying drawing wherein a preferred embodiment of one form of the present invention is clearly shown.

Figures 1, 2, 3:
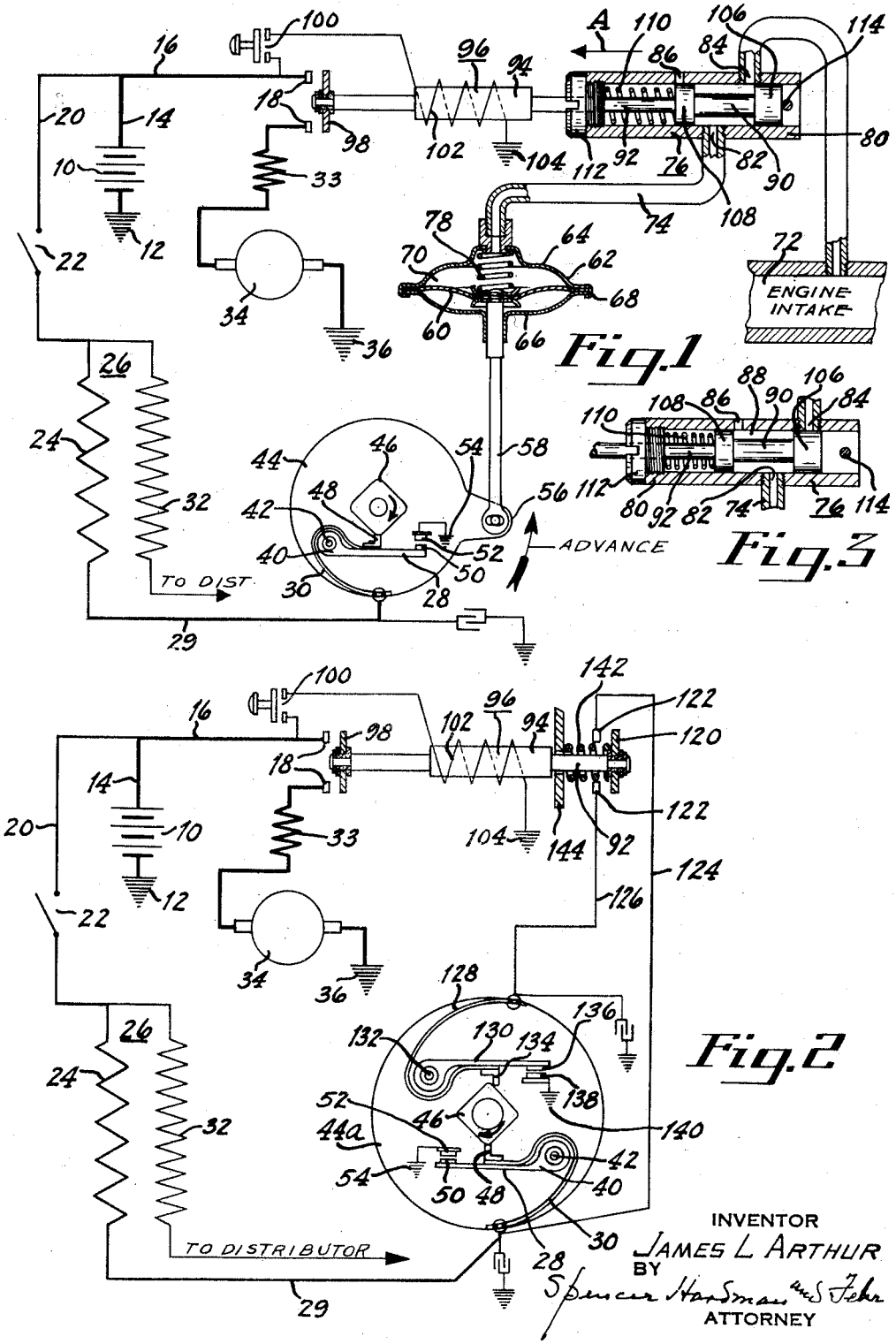
Fig. 1 illustrates an ignition and starting motor circuit embracing the instant improvements.
Fig. 2 illustrates a modified form of the instant control mechanism.
Fig. 3 is a detail view illustrating a change in position of certain parts of the structure, illustrated in Fig. 1.

For economy and safety sake, it is desirable during the cranking operation of an automobile that the occurrence of spark timing be somewhat retarded from the point of occurrence for best engine running economy. A spark retard occurrence satisfactory for engine cranking conditions is wholly inefficient even during engine idling conditions. The changes in spark timing relation are usually made manually while cranking the engine, or else the initial spark timing of the engine is set so low as to be inefficient for idling and low engine speeds. Even with provisions of this kind it sometimes occurs that the attendant of the automobile will fail to make the retarded shift during engine cranking, with the result that accidents of one kind or another occur upon attempting to crank the engine.

It being desirable to eliminate the possibility of accidents and to accomplish the objects desired, applicant has made it possible to make the change in spark timing relation automatic, and substantially coincident with each and every attempt and at the time of engine starting or cranking. It has been found desirable to make this automatic and instantaneous change in spark timing relation dependent upon closing of the starting motor circuit so that when the starting motor circuit is closed there will be an actual step like shift or retard of the spark timing relation, and so that upon deenergization of the starting motor circuit there will be a disqualification of the timer shift apparatus, whereby the spark timing relation that is most efficient for the existing engine running conditions will be automatically reestablished.

Referring to the drawing, 10 indicates a battery or source of energy grounded at 12 and whose battery lead 14 provides a branch 16 leading to a starting motor switch contact 18. A second branch 20 is in communication with an ignition switch 22, from whence connection is made to the primary 24 of an ignition coil 26. The primary is connected with a circuit interrupter 28 through the agency of a convenient conductor 29 and a leaf spring 30. A secondary winding 32 of the ignition coil, communicates with a distributor as is usual and well known in the art. From one of the starting motor switch contacts 18 connection is made to the field winding 33 of the starting motor 34 having a ground connection at 36.

The interrupter 28 usually comprises a circuit breaker lever 40 insulatingly pivoted at 42 to a breaker plate 44 disposed for limited angular movement about an engine driven cam 46. This cam cooperates with a rubbing block 48 carried by the lever 40 to oscillate the same about the pivot 42 against the pressure of spring 30, for periodic opening and closing of a pair of fixed contacts 50 and 52, the latter being grounded to the breaker plate at 54. Means are provided in the well known manner for oscillating the plate 44 about the engine driven cam 46, which oscillation will change the angular relation of the cam and circuit interrupter such that the spark occurrence that is produced upon the opening of the contacts 50 and 52 will be caused to approach or retreat from a position of top dead center as respects the piston in the engine cylinder. The means for producing this angular rotation or oscillation of the breaker plate 44 is usually accomplished by speed responsive mechanism that is old and well known in the art, and not necessary of disclosure in this application.

The instant invention, in one of its forms, presupposes an additional means for oscillating the breaker plate 44 and thereby alters the angular relation between the circuit interrupter and engine driven cam, whereby the additional and predetermined shift can be accomplished for engine starting conditions. This form of the invention is illustrated in detail in Figs. 1 and 3 of the drawing.

The circuit breaker plate 44 is provided with an arm 56 having an articulated connection with a rod 58 drivingly secured to a movable element 60 of a suction responsive device 62. The suction responsive device comprises a pair of shell members 64 and 66 secured together rim to rim as at 68, and thereby clamps the edge of the movable element, in the present instance a flexible diaphragm, to form an expansion chamber 70. The expansion chamber 70 has a fluid connection with the engine intake pipe connection 74 within which is interposed a valving mechanism 76. Also disposed within the expansion chamber 70 there is a spring 78, engaging the movable element 60 of the chamber, whose force acts upon the rod 58 to oscillate the breaker plate to a retarded position.

The valving device 76 comprises a chambered member 80 having a pair of offset ports 82 and 84 with which the pipe connections are made to the expansion chamber and to engine intake respectively.

An atmospheric or flushing port 86 is also provided that opens through the member 80, to the interior bore 88 thereof, for a purpose presently to be described. Within the bore 88 there is a reciprocable butt spring urged spool like valve member 90, that is connected by a stem portion 92 with an armature 94 of a solenoid 96, whose armature also carries a movable contact 98 for bridging the starting motor contacts 18.

A controlling switch 100 is included in an auxiliary circuit to a solenoid winding 102 and is grounded at 104. This solenoid provides means for actuating the starting motor switch, and in coincidence therewith it provides for movement of the valve 90. The valve 90 provides a pair of valving parts 106 and 108, and a spring 110 disposed against the valve part 108 and surrounding the stem 92 connecting it with the armature 94 presses against a gland nut 112 and normally urges the valve 90 along the bore 88 to engage a stop 114. This is the position that is illustrated in Fig. 1 of the drawing and constitutes the position of the valve for conditions of engine rest, and for conditions of engine running. It is the position in which fluid communication is had between the intake pipe 72 and the expansion chamber 70. Under these conditions of valve bias, the ports 82 and 84 of the fluid passage between the expansion chamber 70 and the engine intake 72 will be in direct communication, and the atmospheric port 86 opening into the passage 88 will be closed, under which conditions engine suction within the passage 72 will be communicated to the expansion chamber 70 where it draws the movable element 60 down against the spring 78, thereby operating the rod 58 and the arm 56 to produce an advance in the spark timing relation. This advanced movement will amount to an initial setting of the spark timing relation, or will establish a predetermined angular relation between the circuit interrupter 28 and the engine driven cam 46.

Upon desire to start the engine the switch 100 in the solenoid circuit is closed, whereupon the solenoid winding 102 is energized from the battery 10, and operates to move the core 94 with its attached bridging contact 98 and valve 90 toward the left hand side of Fig. 1, substantially as indicated by the arrow A above the valving device. This operation of the solenoid closes the starting motor circuit through the contacts 18 and the bridging contact 98, and also moves the valve 90 to that position illustrated in Fig. 3. Under these conditions the port 84 is closed by the head member 106, whereupon the suction chamber 70 is cut off from communication with the engine intake passage 72. During the same movement of the rod 90 the atmospheric port 86 has been opened so that the expansion chamber 70 is then in communication with the atmosphere through the port 82, the passage 88 and the port 86. This allows the chamber to expand under the influence of the spring 78, that causes a definite amount of retard in the spark timing relation which is immediately effective upon closing of the starting motor switch. Directly that the starting motor circuit is opened, the spring 110 will return the valve 90 to the position illustrated in Fig. 1, whereupon the suction pressure in the engine intake will be communicated to the suction chamber 70 and the spark timing relation will be returned to what has been determined as the initial setting.

According to the disclosure illustrated in Fig. 2, the same results are accomplished through slightly different means. The same electromagnetic starting motor switch and controller switch are used as in the foregoing disclosure, but the rod 92 attached to the armature 94 insulatingly supports a second bridging contact 120 that cooperates with a pair of contacts 122. One of these contacts communicates by a lead 124 with the leaf spring 30 of the circuit interrupter hereinbefore referred to. The other of the contacts 122 communicates by a lead 126 with a second leaf spring conductor 128. This leaf spring is operable to oscillate an auxiliary circuit breaker 130 about an insulated support 132, so that its rubbing block 134 will be forced into engagement with the engine driven cam 46 hereinbefore referred to. The auxiliary circuit breaker is adapted to open and close a circuit through a pair of contacts 136 and 138, the latter of which is grounded at 140, all in a similar manner to those contacts 50 and 52 of the circuit interrupter first described. Since the auxiliary circuit breaker is mounted on the same breaker plate 44a this places the two circuit interrupters in parallel circuits, both of which branch off from the conductor 29. In mounting the auxiliary circuit interrupter upon the plate 44a it is shifted somewhat to one side of the diametric position with respect to the usual circuit interrupter, such that its action will be somewhat delayed as respects the action of the usual circuit interrupter. The angular displacement corresponds to the magnitude of spark timing shift that is desired for the particular engine.

During engine running conditions, the circuit interrupter 28 will control the ignition timing of the engine, since it alone is functionally operative. This is due to the fact that the circuit through the auxiliary circuit interrupter is incomplete by the open or unbridged condition of the contacts 122. However, as soon as the contacts 122 are bridged by the member 120, then the auxiliary circuit interrupter is functionally operative, and is included in the ignition circuit. Its effect will be superimposed upon that of the circuit interrupter 28.

In other words, closing of the contacts 122 will operate to render circuit interrupter 28 non-operative, for, though the engine driven cam 46 may operate the interrupter 28 to open the contacts 50 and 52, the primary circuit will not be interrupted but will thence be directed from the conductor 100 over the conductor 124, the contacts 122, the bridge 120, and thence through the conductor 126 to the leaf spring 128 and the contacts 136 and 138 to ground at 140. That will allow the primary current to continue flowing until the auxiliary circuit interrupter 130 is actuated to open the contacts 136 and 138.

It will be recalled that the spark manifestation does not occur until the primary circuit is entirely open, and therefore when the contacts 122 are closed there is an overlapping dwell of the two pairs of contacts, as well as a continued closing of the contacts 136 and 138 for a short time after the opening of the contacts 50 and 52. Consequently, upon closing of the contacts 122, a positive shift in the angular relation between the engine driven cam and the effective circuit interrupter will be accomplished, and this shift will be made whenever the controller switch 100 is closed so as to actuate the armature 94.

To insure quick return of the armature 94 so as to break the circuit at the contacts 18 and at the contacts 122 a spring 142 surrounding the rod 92 is disposed between the bridging contact 120 and a stop member 144. As soon as the controller circuit through the solenoid is opened, the spring 142 overcomes the effect of the solenoid winding and coincidentally opens the circuits through the contacts 18 and 122.

While the form of embodiment of the present invention as herein disclosed, constitutes a preferred form, it is to be understood that other forms might be adopted, all coming within the scope of the claims which follow.

What is claimed is as follows:

1. In a starting device for internal combustion engines having an ignition timer and automatic means operable by the engine for operating said timer to change the time relation of the spark occurrence during the normal operation of the engine, the combination comprising a current source, a starting motor, a normally open circuit between said starting motor and the current source, electromagnetic means for closing said circuit to cause the starting motor to become operative to start the engine, and means operated by said electromagnetic means for so controlling the operation of said timer operating means as to cause the spark to be retarded during engine starting.

2. In a starting device for internal combustion engines having an ignition timer and means operable by engine suction for operating said timer to change the time relation of the spark occurrence during the normal operation of the engine, the combination comprising a current source, a starting motor, a normally open circuit between said starting motor and the current source, electromagnetic means for closing said circuit to cause the starting motor to become operative to start the engine, and means operated by said electromagnetic means for so controlling the operation of said suction operated means as to cause the spark to be retarded during the starting of the engine.

3. In a starting device for internal combustion engines having an ignition timer and automatic means operable by the engine for operating said timer to change the time relation of the spark occurrence during the normal operation of the engine, the combination comprising a current source, a starting motor, a normally open circuit between said starting motor and the current source, electromagnetic means for closing said circuit to cause the starting motor to become operative to start the engine, and means acting upon the timer operating means and responsive to the control of the electromagnetic means to cause said timer operating means to retard the spark a predetermined amount during the starting of the engine.

4. In a starting system for automotive engines having a timer characterized by means for altering the time relation of the spark occurrence, the combination comprising, a starting motor with a normally opened circuit therethrough, electromagnetic means for closing the circuit to start the engine, means operated by the electromagnetic means for actuating the timer altering means to retard the spark timing relation only during engine starting, said actuating means comprising an expansion chamber having a fluid connection to the engine intake, and valve means inserted in the fluid connection to be operated by the electromagnetic means for controlling the effect of the engine intake pressure in the expansion chamber.

5. Ignition apparatus for internal combustion engines comprising in combination, a starting motor and a circuit for energizing the same, a circuit interrupter, an engine driven cam for operating the interrupter, a device responsive to closing of the starting motor circuit for controlling the angular relation between the interrupter and cam in order to control the timing of ignition, said device comprising a solenoid, a valve to be operated by the solenoid, an expansion chamber having a fluid connection including the valve with an engine intake passage, and means mechanically connecting a movable part of the expansion chamber with a support for the circuit breaker.

6. Ignition apparatus for internal combustion engines comprising in combination, a starting motor and a circuit for energizing the same, a circuit interrupter, an engine driven cam for operating the interrupter, a device responsive to closing of the starting motor circuit for controlling the angular relation between the interrupter and cam in order to control the timing of ignition, said device comprising, means responsive to engine intake pressure for shifting the angular position of the interrupter, and means actuated upon closing of the starting motor circuit for canceling the effect of the engine intake pressure upon the shifting means.

7. Ignition apparatus for an internal combustion engine having an intake pipe and comprising in combination, a starting motor and a circuit for energizing the same, a circuit interrupter, an engine driven cam for operating the interrupter, a device responsive to closing of the starting motor circuit for controlling the angular relation between the interrupter and cam in order to control the timing of ignition, said device comprising, means responsive to engine intake pressure for shifting the interrupter, fluid conducting means connecting the responsive means to an engine intake passage, valving mechanism in said fluid conducting means actuatable upon closing of the starting motor circuit, said means normally providing communication between the pressure responsive means and the engine intake, and adapted to close the pressure responsive means to engine intake pressure and to open the same to atmospheric pressure upon closing of the starting motor circuit.

8. Ignition apparatus for internal combustion engines comprising in combination, a starting motor and a circuit for energizing the same, a circuit interrupter, an engine driven cam for operating the interrupter, a device responsive to closing of the starting motor circuit for controlling the angular relation between the interrupter and cam in order to control the timing of ignition, said device comprising, means responsive to engine suction in the engine intake pipe for retarding the spark timing relation during engine starting, and for advancing the spark timing relation as soon as the engine has been started.

9. Ignition apparatus for internal combustion engines comprising in combination, a starting motor and a circuit for energizing the same, electromagnetic means for closing the starting motor circuit, a circuit interrupter, an engine driven cam for operating the interrupter, a device responsive to closing of the starting motor circuit for altering the angular relation between the interrupter and cam in order to control the timing of ignition, said device comprising, means responsive to engine intake pressure for altering the angular relation of the cam and interrupter, and means actuatable by the electromagnetic means for controlling the effect of the engine intake pressure upon the pressure responsive means whereby the spark timing relation may be retarded only during engine starting conditions.

10. Ignition apparatus for internal combustion engines comprising in combination, a starting motor and a circuit for energizing the same, a circuit interrupter, an engine driven cam for operating the interrupter, a device responsive to closing of the starting motor circuit for controlling the timing of ignition, said device comprising a solenoid, an expansion chamber having a fluid connection with an engine intake passage, and means operated by the solenoid for altering the fluid connection to the expansion chamber, whereby the ignition timing of the engine is changed coincident with closing and opening of the starting motor circuit.

JAMES L. ARTHUR.